(12) United States Patent
Harris et al.

(10) Patent No.: US 11,391,192 B1
(45) Date of Patent: Jul. 19, 2022

(54) ENGINE OFF SELECTIVE CATALYTIC REDUCTION CATALYST LOADING

(71) Applicant: Tenneco Automotive Operating Company Inc., Lake Forest, IL (US)

(72) Inventors: Thomas M. Harris, Jackson, MI (US); Alan C. Brockman, Ann Arbor, MI (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 0 days.

(21) Appl. No.: 17/360,226

(22) Filed: Jun. 28, 2021

(51) Int. Cl.
| | | |
|---|---|---|
| *F01N 3/20* | (2006.01) | |
| *F01N 3/32* | (2006.01) | |
| *F01N 3/36* | (2006.01) | |
| *B01D 53/94* | (2006.01) | |

(52) U.S. Cl.
CPC ......... *F01N 3/208* (2013.01); *B01D 53/9431* (2013.01); *B01D 53/9495* (2013.01); *F01N 3/32* (2013.01); *F01N 3/36* (2013.01); *F01N 2610/02* (2013.01); *F01N 2610/1453* (2013.01); *F01N 2900/1602* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,974,791 | A * | 11/1999 | Hirota | ..................... F01N 3/027 60/303 |
| 7,448,202 | B2 * | 11/2008 | Tsujimura | ............... F01N 11/00 60/277 |
| 8,424,295 | B2 | 4/2013 | Bidner et al. | |
| 8,707,684 | B2 | 4/2014 | Gonze et al. | |
| 8,720,192 | B2 | 5/2014 | Gonze et al. | |
| 8,764,607 | B2 | 7/2014 | Gonze et al. | |
| 8,978,370 | B2 | 3/2015 | Gonze et al. | |
| 8,997,467 | B2 | 4/2015 | Grzesiak et al. | |
| 9,021,792 | B2 * | 5/2015 | Hosoya | ..................... F01N 3/08 60/299 |
| 9,181,837 | B2 * | 11/2015 | Kondo | ..................... F01N 3/22 |
| 9,850,832 | B2 | 12/2017 | Dudar | |
| 10,473,011 | B2 | 11/2019 | Kurtz et al. | |
| 10,502,167 | B2 | 12/2019 | Martin et al. | |
| 2004/0255876 | A1 * | 12/2004 | Hirooka | ..................... F01N 3/22 123/542 |
| 2013/0291526 | A1 * | 11/2013 | Gonze | ................... B60W 20/14 60/311 |
| 2014/0260208 | A1 * | 9/2014 | Sato | ........................ C01B 13/11 60/286 |

* cited by examiner

*Primary Examiner* — Binh Q Tran

(74) *Attorney, Agent, or Firm* — Harness, Dickey & Pierce, P.L.C.

(57) ABSTRACT

An exhaust control system includes: a temperature control module configured to, in response to a shutdown of an engine, turn on an air pump that, when on, pumps air into an exhaust system of the engine upstream of a selective catalytic reduction (SCR) catalyst; a target module configured to, while the air pump is on and the engine is off in response to the shutdown, selectively determine a target rate of injection of a diesel exhaust fluid (DEF) by a DEF injector based on increasing a present amount of ammonia stored by the SCR catalyst to at least a predetermined amount of ammonia; and a DEF control module configured to, while the air pump is on and the engine is off in response to the shutdown, control injection of the DEF by the DEF injector upstream of the SCR catalyst based on the target rate.

20 Claims, 3 Drawing Sheets

ENGINE OFF SELECTIVE CATALYTIC REDUCTION CATALYST LOADING

FIELD

The present disclosure relates to exhaust control systems and methods and more particularly to systems and methods for controlling selective reduction catalyst (SCR) temperature and diesel exhaust fluid (DEF) injection after engine shutdown.

BACKGROUND

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

Air is drawn into an engine through an intake manifold. The air mixes with fuel from one or more fuel injectors to form an air/fuel mixture. The air/fuel mixture is combusted within one or more cylinders of the engine. Combustion of the air/fuel mixture generates torque. The present application involves an engine that uses diesel fuel, and carries out combustion with an excess of air relative to the stoichiometry of the combustion reaction.

Exhaust resulting from the combustion of the air/fuel mixture is expelled from the cylinders to an exhaust system. The exhaust from an engine combusting diesel fuel with an excess of air may include particulate matter (PM) and gas. The exhaust gas includes nitrogen oxides (NOx), such as nitrogen oxide (NO) and nitrogen dioxide ($NO_2$). An exhaust treatment system may be used to reduce the amount of NOx and PM in the exhaust.

The exhaust treatment system may include a diesel oxidation catalyst (DOC). The DOC removes hydrocarbons and/or carbon oxides from the exhaust. The exhaust treatment system may also include a diesel particulate filter (DPF), which removes particulate matter (PM) from the exhaust. The exhaust treatment system may also include a selective catalytic reduction (SCR) catalyst. A diesel exhaust fluid (DEF) injector injects a DEF (e.g., a urea-water solution) into the decomposition tube, or reactor, located upstream of the SCR catalyst. When the DEF encounters hot exhaust in the decomposition tube, the water portion undergoes evaporation and the urea undergoes decomposition to form ammonia. The ammonia ($NH_3$) provided by the DEF is adsorbed by the SCR catalyst. When ammonia is present on the surface of the SCR catalyst, and the catalyst is hot, NOx in the exhaust will react with the ammonia to form nitrogen ($N_2$). In this way the amount of NOx emitted by the engine is reduced.

The SCR catalyst may only be effective at reacting with NOx at elevated exhaust temperatures. Similarly, DEF injected into the decomposition tube may only be processed into ammonia at elevated exhaust temperatures. Exhaust temperatures at engine startup are generally low, so some operating time may pass before the SCR catalyst is warmed up and ammonia is "loaded" onto the catalyst. Therefore, relatively higher levels of NOx may be emitted by the engine during a cold start.

Generally stated, SCR catalysts may "store" ammonia. When the engine is turned off, the SCR catalyst may have some stored ammonia, but the amount of ammonia stored may not be high enough for the next cold start. A need exists to load the SCR catalyst with ammonia before the engine is started.

SUMMARY

In a feature, an exhaust control system includes: a temperature control module configured to, in response to a shutdown of an engine, turn on an air pump that, when on, pumps air into an exhaust system of the engine upstream of a selective catalytic reduction (SCR) catalyst; a target module configured to, while the air pump is on and the engine is off in response to the shutdown, selectively determine a target rate of injection of a diesel exhaust fluid (DEF) by a DEF injector based on increasing a present amount of ammonia stored by the SCR catalyst to at least a predetermined amount of ammonia; and a DEF control module configured to, while the air pump is on and the engine is off in response to the shutdown, control injection of the DEF by the DEF injector upstream of the SCR catalyst based on the target rate.

In further features, when a temperature of the SCR catalyst is greater than a predetermined temperature, the temperature control module is configured to operate the air pump.

In further features, the temperature control module operates the air pump for a predetermined period before determining whether the temperature of the SCR catalyst is greater than the predetermined temperature.

In further features, when the temperature of the SCR catalyst is greater than the predetermined temperature, the temperature control module is further configured to: disable fuel injection by a fuel injector configured to inject fuel into the exhaust system upstream of the SCR catalyst; and disable spark from a spark plug configured to ignite fuel from the fuel injector.

In further features, a maximum ammonia storage capacity of the SCR catalyst is less than the predetermined amount of ammonia when the temperature of the SCR catalyst is greater than the predetermined temperature.

In further features: when the temperature of the SCR catalyst is greater than the predetermined temperature, the target module is configured to set the target rate of injection of the DEF to zero; and the DEF control module is configured to not inject DEF using the DEF injector when the target rate of injection of DEF is set to zero.

In further features: when the temperature of the SCR catalyst is less than the predetermined temperature, the target module is configured to determine a target injection rate based on an enthalpy rate of gas flowing to the SCR catalyst; and the DEF control module is configured to inject DEF based on the target injection rate.

In further features, the target module is configured to decrease the target injection rate as the enthalpy rate decreases.

In further features, the target module is configured to increase the target injection rate as the enthalpy rate increases in response to an addition of heat.

In further features, when the target injection rate is zero, the temperature control module is configured to: operate the air pump; enable fuel injection by a fuel injector configured to inject fuel into the exhaust system upstream of the SCR catalyst; and provide spark from the spark plug configured to ignite fuel from the fuel injector.

In further features: in response to a determination that the present amount of ammonia stored by the SCR catalyst is greater than or equal to the predetermined amount of ammonia after the shutdown, the target module is configured to set the target rate of injection of the DEF to zero; the DEF control module is configured to not inject DEF using the DEF injector when the target rate of injection of DEF is set to zero; and in response to the determination that the present amount of ammonia stored by the SCR catalyst is greater than or equal to the predetermined amount of ammonia after the shutdown, the temperature control module is configured to: turn off the air pump; disable fuel injection by a fuel injector configured to inject fuel into the exhaust system upstream of the SCR catalyst; and disable spark from a spark plug configured to ignite fuel from the fuel injector.

In a feature, an exhaust control method includes: in response to a shutdown of an engine, turning on an air pump that, when on, pumps air into an exhaust system of the engine upstream of a selective catalytic reduction (SCR) catalyst; while the air pump is on and the engine is off in response to the shutdown, selectively determining a target rate of injection of a diesel exhaust fluid (DEF) by a DEF injector based on increasing a present amount of ammonia stored by the SCR catalyst to at least a predetermined amount of ammonia; and while the air pump is on and the engine is off in response to the shutdown, injecting DEF by the DEF injector upstream of the SCR catalyst based on the target rate.

In further features, the exhaust control method further includes, when a temperature of the SCR catalyst is greater than a predetermined temperature, operating the air pump.

In further features, the exhaust control method further includes operating the air pump for a predetermined period before determining whether the temperature of the SCR catalyst is greater than the predetermined temperature.

In further features, the exhaust control method further includes, when the temperature of the SCR catalyst is greater than the predetermined temperature: disabling fuel injection by a fuel injector configured to inject fuel into the exhaust system upstream of the SCR catalyst; and disabling spark from a spark plug configured to ignite fuel from the fuel injector.

In further features, a maximum ammonia storage capacity of the SCR catalyst is less than the predetermined amount of ammonia when the temperature of the SCR catalyst is greater than the predetermined temperature.

In further features, the exhaust control method further includes: when the temperature of the SCR catalyst is greater than the predetermined temperature, setting the target rate of injection of the DEF to zero; and not injecting DEF using the DEF injector when the target rate of injection of DEF is set to zero.

In further features, the exhaust control method further includes: when the temperature of the SCR catalyst is less than the predetermined temperature, determining a target injection rate based on an enthalpy rate of gas flowing to the SCR catalyst; and injecting DEF based on the target injection rate.

In further features, the exhaust control method further includes decreasing the target injection rate as the enthalpy rate decreases.

In further features, the exhaust control method further includes increasing the target injection rate as the enthalpy rate increases in response to an addition of heat.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

A control module controls injection of a diesel exhaust fluid (DEF) into an exhaust system upstream of a selective catalytic reduction (SCR) catalyst. The SCR catalyst receives exhaust output by an engine of a vehicle. The exhaust includes nitrogen oxides (NOx). The DEF includes urea and water. Heat from the exhaust decomposes urea from the DEF into ammonia ($NH_3$). The SCR catalyst stores ammonia. Ammonia reacts with NOx in the exhaust thereby reducing the amount of NOx that is output from the SCR catalyst.

The engine may generate a high level of NOx at startup. The amount of ammonia stored on (by) the SCR at startup, however, may be low. The temperature of the exhaust at engine start up may be too low to enable DEF injected into a decomposition tube to be processed into ammonia. The NOx output of the vehicle may therefore be relatively high after engine startup.

The present application involves injecting DEF into the decomposition tube in response to engine shut down until the SCR catalyst has stored at least a predetermined amount of ammonia. An electric air pump that operates using power from a battery and located upstream of the DOC and DPF is used to create a flow of hot gas through the exhaust system. DEF is injected into the decomposition tube. The hot gas decomposes the injected DEF into ammonia for storage by the SCR catalyst. If the temperature of the hot gas becomes too low to process the injected DEF into ammonia, an exhaust burner also located upstream of the DOC and DPF may be turned on to heat the air flow from the pump. If the temperature of the SCR catalyst is too high initially after engine shutdown, such that a maximum storage capacity of the SCR catalyst is less than the predetermined amount of ammonia, the air pump may be used to cool the SCR catalyst before DEF injected begins. NOx output of the vehicle may be decreased by the SCR catalyst being post-loaded with at least the predetermined amount of ammonia when the engine is next started.

Figure 1:
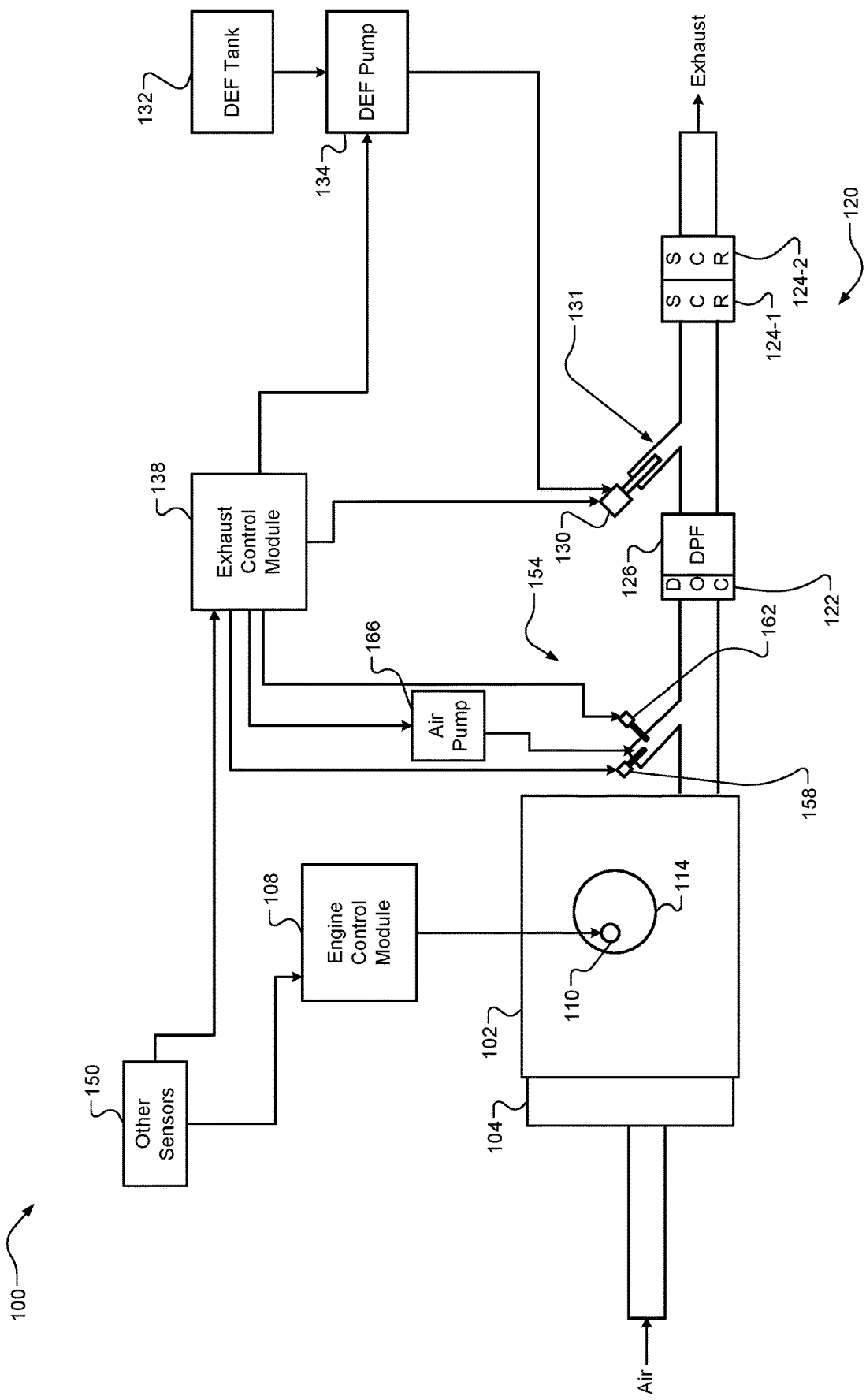
FIG. 1 is a functional block diagram of an example engine system.

Referring now to FIG. 1, a functional block diagram of an example engine system 100 is presented. An engine 102 generates propulsion torque for a vehicle. The vehicle may be have a class 4 rating, a class 5 rating, a class 6 rating, a class 7 rating, or a class 8 rating, such as from the United States Department of Transportation (DOT). Class ratings of vehicles are based on gross vehicle weight rating (GVWR). Generally speaking, GVWR increases as class rating increases and vice versa. While the engine 102 is shown and will be discussed as a diesel engine, the engine 102 may be another suitable type of engine. One or more electric motors (or motor-generators) may additionally generate propulsion torque.

Air is drawn into the engine 102 through an intake manifold 104. One or more fuel injectors, such as fuel injector 110, inject fuel that mixes air to form an air/fuel mixture. The air/fuel mixture is combusted within cylinders of the engine 102, such as cylinder 114. The fuel injector 110 inject fuel directly into the cylinder 114. Heat from compression within the cylinder 114 may initiate combustion within the cylinder 114. The ECM 108 controls fuel injection by the fuel injector 110. Although the engine 102 is depicted as including one cylinder, the engine 102 may include more than one cylinder. One fuel injector may be provided per cylinder.

Exhaust is expelled from the engine 102 to an exhaust system 120. The exhaust may include particulate matter (PM) and exhaust. The exhaust (gas) includes nitrogen oxides (NOx), such as nitrogen oxide (NO) and nitrogen dioxide ($NO_2$). The exhaust system 120 includes a treatment system that reduces the respective amounts of NOx and PM in the exhaust.

The exhaust system 120 includes a diesel oxidation catalyst (DOC) 122 and a diesel particulate filter (DPF) 126, and one or more selective catalytic reduction (SCR) catalysts, such as SCR 124-1 and SCR 124-2 (collectively "SCR catalyst 124"). The SCR catalyst 124-1 may, for example, include an iron zeolite or another suitable type of SCR catalyst. The SCR catalyst 124-2 may include a copper zeolite or another suitable type of SCR catalyst. In various implementations, the SCR catalysts 124-1 and 124-2 may be implemented within the same housing.

The exhaust flows from the engine 102 to the DOC 122. Exhaust output from the DOC 122 flows to the DPF 126. The DPF 126 filters particulate from the exhaust. In various implementations, the DPF 126 and the DOC 122 may be implemented within the same housing. While the example of the DPF 126 being disposed downstream of the DOC 122 is provided, the DPF 126 may alternatively be disposed upstream of the DOC 122. The exhaust flows from the DPF 124 to the SCR catalyst 124.

A diesel exhaust fluid (DEF) injector 130 injects a DEF into the exhaust system 120 upstream of the SCR catalyst 124. For example, the DEF injector 130 may inject the DEF into a decomposition tube 131 where water in injected DEF evaporates and urea is decomposed and hydrolyzed into NH3. The decomposition tube 131 may also be referred to as a reactor. For example only, the decomposition tube 131 may be located between the DOC 122 and the SCR catalyst 124. The DEF includes urea (e.g., $CO(NH_2)_2$) and water. The DEF is stored in a DEF tank 132 before injection. A DEF pump 134 draws DEF from the DEF tank 132 and pumps the DEF to the DEF injector 130.

An exhaust control module 138 controls the DEF injector 130 and therefore controls injection of DEF into the exhaust system 120. The exhaust control module 138 may also control operation of the DEF pump 134, such as to maintain a predetermined pressure of DEF input to the DEF injector 130.

When the engine is running, normal burner and DEF control may be used. When the engine is running, urea from DEF injected by the DEF injector 130 reacts with the hot exhaust to produce ammonia, and ammonia is supplied to the SCR catalyst 124. Heat evaporates the water in the DEF, and ammonia ($NH_3$) is supplied to the SCR catalyst 124. During a post-loading process, when the engine is off, a flow of air is provided by an electric air pump (discussed further below), and that air is heated by the DOC and DPF as it passes through those components on its way to the decomposition tube.

The SCR catalyst 124 stores (i.e., adsorbs) ammonia supplied by the DEF. The SCR catalyst 124 catalyzes a reaction between stored ammonia and NOx passing the SCR catalyst 124.

The amount of ammonia stored by the SCR catalyst 124 may be referred to as current storage. The current storage may be expressed as a mass of ammonia (e.g., grams), a number of moles of ammonia, or another suitable measure of the amount of ammonia stored by the SCR catalyst 124.

A percentage of NOx input to the SCR catalyst 124 that is removed from exhaust via reaction with ammonia may be referred to as NOx conversion efficiency. The NOx conversion efficiency is a function of the current storage of the SCR catalyst 124. For example only, the NOx conversion efficiency may increase as the current storage of the SCR catalyst 124 increases and vice versa.

The current storage of the SCR catalyst 124, however, is limited to a maximum amount of ammonia. This maximum amount of ammonia is referred to as a maximum storage capacity of the SCR catalyst 124. Maintaining the current storage of the SCR catalyst 124 near the maximum storage capacity ensures that a maximum possible amount of NOx is removed from the exhaust. In other words, maintaining the current storage near the maximum storage capacity may ensure that a greatest possible NOx conversion efficiency is achieved.

However, an inverse relationship exists between the maximum storage capacity and a temperature of the SCR catalyst 124. More specifically, the maximum storage capacity decreases as the SCR temperature increases during engine operation and vice versa.

The reaction of ammonia with NOx produces nitrogen and water. Other components of the exhaust, such as oxygen ($O_2$), may also be involved in the ammonia and NOx reaction.

One or more sensors may be implemented in the exhaust system 120, such as one or more NOx sensors, one or more temperature sensors, one or more oxygen sensors, and/or one or more other types of sensors. For example, a temperature sensor may measure a temperature of the SCR catalyst 124. In various implementations, the temperature of the SCR catalyst 124 may be estimated based on one or more exhaust temperatures. Other example types of sensors include a mass air flowrate (MAF) sensor, a recirculated exhaust flow rate (EFR) sensor, an intake air temperature (IAT) sensor, a coolant temperature sensor, a manifold absolute pressure (MAP) sensor, an engine speed (RPM) sensor, an exhaust pressure sensor, and/or one or more other suitable sensors. Sensors are collectively illustrated by 150 in FIG. 1.

A burner 154 may also be connected to the exhaust system 120, such as upstream of the DOC 122 and the DPF 126. The burner 154 may include a fuel injector 158, a spark plug 162, and an air pump 166. While the example of the burner 154 including a spark plug is provided, the present application is also applicable to other types of igniters and ignition devices. When on, the air pump 166 pumps air into the burner 154 and to the exhaust system 120. The fuel injector 158 injects fuel (e.g., diesel fuel) that mixes with the air from the air pump 166. The spark plug 162 generates spark that ignites the air and fuel from the fuel injector 158 and the air pump 166. The combustion of the air and fuel generates hot gas, which can be used to heat one or more components of the exhaust system 120 and/or for one or more other reasons.

The exhaust control module 138 controls fuel injection by the fuel injector 158, spark generation by the spark plug 162, and operation of the air pump 166. In various implementations, the exhaust control module 138 may control a speed of the air pump 166, whether or not the burner 154 is receiving fuel for combustion. When receiving fuel, the exhaust control module 138 may control the speed of the air pump 166 to achieve the desired air-to-fuel ratio. If the burner 154 is operated while the engine is running, the exhaust control module 138 may operate the burner 154 over a full range of air-to-fuel ratios that enable stable combustion. If the burner 154 is operated when the engine is not running for the purpose of supporting the post-loading of ammonia onto the SCR catalyst 124, the exhaust control module 138 may operate the burner 154 with a predetermined (e.g., highest possible) air-to-fuel ratio to ensure complete combustion of the fuel (e.g., to minimize carbon monoxide and unburned hydrocarbons emission) and to provide a predetermined (e.g., highest possible) rate of heat flow to the decomposition tube 131 where DEF is being injected.

The engine control module (ECM) 108 controls a torque output of the engine 102 while the engine 102 is running. The ECM 108 also controls starting and shutdown of the engine 102. The ECM 108 may start the engine 102, for example, in response to user actuation of one or more user input devices, such as an ignition button or switch of the vehicle and/or a combination of one or more user input devices of a key fob. The ECM 108 may shut down the engine 102, for example, in response to user actuation of the one or more user input devices (e.g., the ignition button or switch) of the vehicle and/or the one or more user input devices of the key fob.

As discussed above, the exhaust control module 138 may control injection of the DEF by the DEF injector 130. For example only, the exhaust control module 138 may control the timing and rate of DEF injection. By controlling DEF injection, the exhaust control module 138 controls the supply of ammonia to the SCR catalyst 124 and the current storage of the SCR catalyst 124.

The rate at which DEF is injected may be referred to as a DEF injection rate (e.g., grams per second). A rate at which ammonia is supplied to the SCR catalyst 124 may be referred to as an ammonia supply rate (e.g., grams per second). The exhaust control module 138 may determine a target supply rate for supplying ammonia to the SCR catalyst 124, determine a target DEF injection rate to achieve the target supply rate, and control the injection of DEF at the target DEF injection rate. For complete DEF processing into ammonia, the rate of DEF dosing may be controlled to not exceed a minimal heat flow rate of the exhaust (when the engine is on) or of hot air flow created for post-loading (when the engine is off)

The NOx emissions of the vehicle may be relatively high for a period after engine startup. Exhaust system components remain relatively warm for a period after engine shutdown. Heat from the exhaust system components may be used to provide hot air for post-loading the SCR catalyst 124 after engine shutdown.

The present application involves loading the SCR catalyst 124 with ammonia after engine shutdown using the air pump 166 and heat from one or more exhaust system components. If the temperature of the SCR catalyst 124 is too high (such that the maximum storage capacity of the SCR catalyst 124 is lower than a predetermined storage capacity), the air pump 166 may be used to cool the SCR catalyst 124 before DEF injection is performed. If the temperature of the SCR catalyst 124 becomes too low after the engine shutdown to decompose injected DEF into ammonia, the burner 154 may be used to heat the exhaust control module 138 the DOC 122 and DPF 126 so that they can provide heat to the air flow during the post-loading process. DEF injection may be performed after engine shutdown to adjust the current storage of the SCR catalyst 124 to the predetermined storage capacity. This may position the SCR catalyst 124 to better minimize NOx output of the vehicle for the next cold start of the engine 102.

Figure 2:
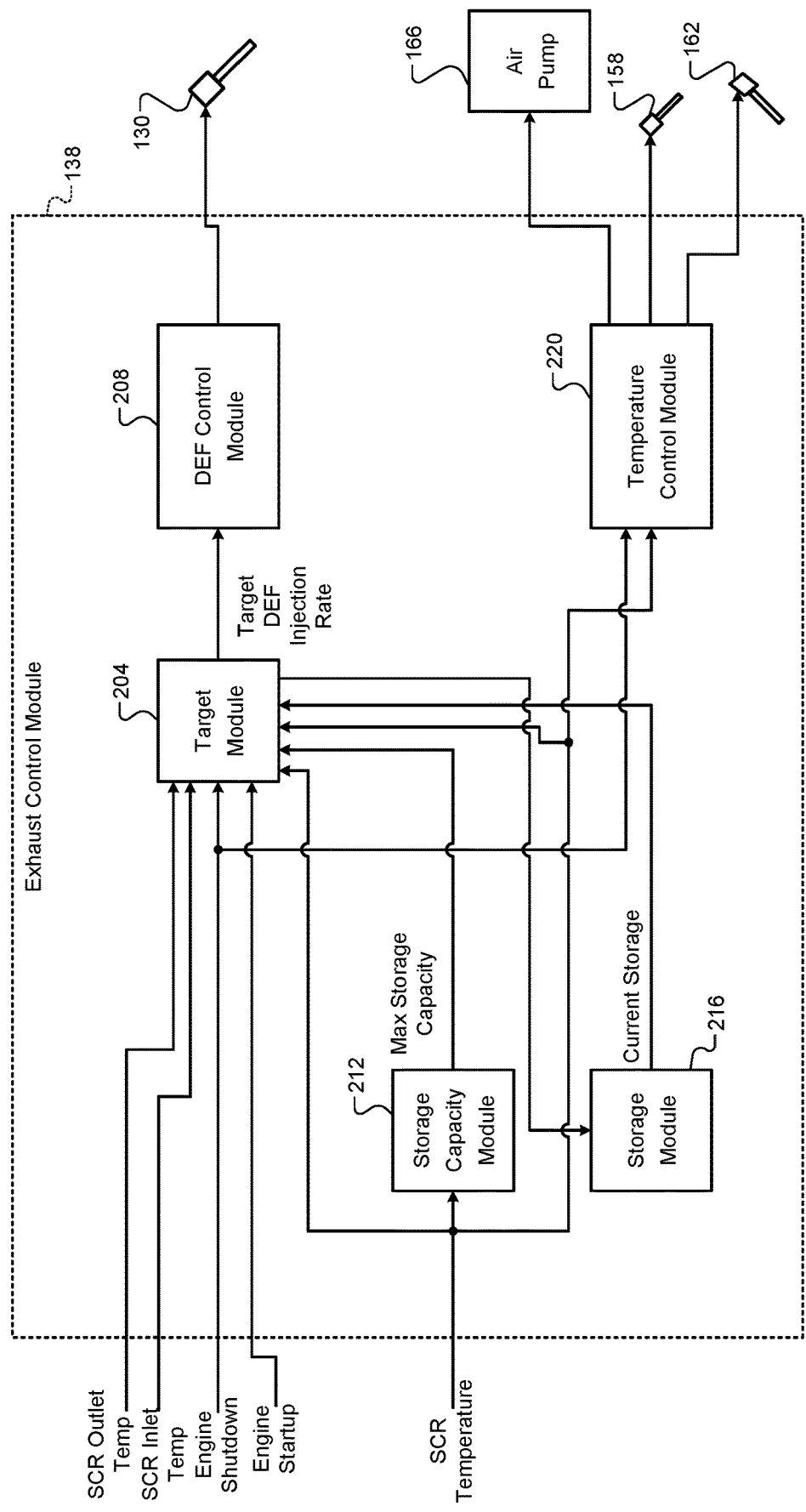
FIG. 2 is a functional block diagram of an example exhaust control system.

FIG. 2 is a functional block diagram of an example exhaust control system. A target module 204 determines a target DEF injection rate, for example, based on a target (ammonia) supply rate to the SCR catalyst 124. The target module 204 may determine the target DEF injection rate using one of a lookup table and an equation that relates target supply rates to target DEF injection rates. The target DEF injection rate corresponds to an injection rate of the DEF to achieve the target supply rate of ammonia to the SCR catalyst 124. The target supply rate corresponds to a target rate to supply ammonia to the SCR catalyst 124.

A DEF control module 208 controls opening and closing of the DEF injector 130 to control injection and to achieve the target DEF injection rate. The DEF control module 208 may open the DEF injector 130 by applying power (e.g., from a battery) to the DEF injector 130. The DEF control module 208 may close the DEF injector 130 by disconnecting the DEF injector 130 from power. The DEF control module 208 may control the DEF injector 130 using pulse width modulation (PWM) control or another suitable type of control.

The target module 204 may determine the target supply rate, for example, based on a target current storage for the SCR catalyst 124, a current storage of the SCR catalyst 124, and/or one or more other parameters. The target module 204 may determine the target supply rate, for example, using one of an equation and a lookup table that relates target current storage, current storage and the other parameter(s) to target supply rates.

While the engine is running, the target module 204 may determine the target current storage, for example, based on a predetermined percentage of a present maximum storage capacity of the SCR catalyst 124. The predetermined percentage may be, for example, 90 percent, 95 percent, or another suitable value less than or equal to 100 percent and greater than or equal to 10 percent. A predetermined percentage of 100 percent may increase a likelihood of ammonia slip, for example, in response to an increase in temperature, which causes a decrease in the maximum storage capacity and may cause ammonia to desorb from the SCR catalyst 124.

A storage capacity module 212 may determine the present maximum storage capacity based on a present temperature of the SCR catalyst 124. For example, the storage capacity module 212 may increase the present maximum storage capacity as the temperature decreases and vice versa. The storage capacity module 212 may determine the present maximum storage capacity using one of a lookup table and an equation that relates temperatures of the SCR catalyst 124 to maximum storage capacities.

When the engine 102 is off in response to an engine shutdown, the target module 204 may set the target storage to a percentage of a maximum storage capacity of the SCR catalyst 124 at a specified temperature. For example, the target module 204 may set the target current storage to 100 percent of the maximum storage capacity of the SCR catalyst 124 at 150 degrees Celsius. While these examples are provided, other percentages, temperatures, and target current storages values may be used. Copper-zeolite SCR catalysts may have storage levels approximately 3 grams/Liter of substrate volume.

A temperature of the SCR catalyst 124 at engine shutdown may be greater than or equal to the specified temperature. With the SCR 124 being warmer than the specified temperature, the present storage may be less than the target current storage (e.g., because the maximum storage capacity is lower at the higher temperature than it is at the specified temperature). So, as the SCR catalyst 124 cools off after the engine 102 has been shut off, DEF injection is performed, and that DEF will be processed into $NH_3$ that will adsorb onto the SCR catalyst 124.

A storage module 216 may determine the present (ammonia) storage of the SCR catalyst 124. While the engine 102 is off in response to an engine shutdown, the engine 102 is not outputting NOx. However, the present storage of the SCR catalyst 124 will be known as the storage module 216 tracks the current storage while the engine 102 is on. The present storage increases while DEF injection is performed while the engine 102 is off. The storage module 216 may receive a present ammonia supply rate (e.g., grams per second). For example, the storage module 216 may receive the target supply rate from the target module 204. The storage module 216 may (mathematically) integrate the ammonia supply rate each predetermined period to determine masses of ammonia supplied to the SCR catalyst 124. The storage module 216 may add each mass of ammonia to the (then) current storage to update the current storage over time as DEF injection is performed.

A temperature control module 220 controls operation of the air pump 166, the fuel injector 158, and the spark plug 162. When the engine 102 is shut down, the temperature control module 220 may turn on the air pump 166 and not inject fuel or provide spark when the temperature of the SCR catalyst 124 is greater than a predetermined temperature. The predetermined temperature corresponds to a temperature of the SCR catalyst 124 where the maximum storage capacity will be greater than or equal to the predetermined storage targeted while the engine 102 is shutdown. When the temperature of the SCR catalyst 124 is greater than the predetermined temperature, the SCR catalyst 124 may not adsorb ammonia provided to it and may not be able to store ammonia to a level corresponding to a storage target at the lower temperature value specified above. Operating the air pump 166 may cool the SCR catalyst 124 and increase the maximum storage capacity of the SCR catalyst 124 in this situation.

When the engine 102 is shut down, the temperature control module 220 may also turn on the burner 154 (e.g., turn on the air pump 166, inject fuel, and provide spark) when the target DEF injection rate (determined based on the enthalpy rate corresponding to the endothermic processes of water evaporation and urea decomposition) reaches zero. DEF may not be able to decompose into ammonia when the enthalpy rate of the hot air flow is low. Operating the burner 154 may therefore provide heat to increase the enthalpy rate and decompose injected DEF into ammonia for storage by the SCR catalyst 124.

The DEF control module 208 injects DEF based on or at the target DEF injection rate. The target DEF injection rate may be set to zero based on the enthalpy rate of the hot air flow or when the temperature of the SCR catalyst 124 is greater than the predetermined temperature while the engine 102 is shut down.

Once the current storage of the SCR catalyst 124 becomes greater than or equal to the predetermined storage while the engine 102 is shut down, DEF injection may be ended and the burner 154 may be turned off. The DEF injection may continue until the current storage reaches the predetermined storage while the engine 102 is off. The DEF injection prepares the SCR catalyst 124 to minimize NOx output at and after the next engine startup.

Regarding setting the target DEF injection rate, the target module 204 may first determine an amount of NH3 to be input to reach the target current storage based on a difference between the present storage and the target current storage. Second, based on the amount of NH3 to be input, the target module 204 may determine an amount of DEF to inject into the decomposition tube 131 to provide the amount of NH3. The target module 204 may set the target injection rate (e.g., over time) based on various factors, such as the SCR temperature or the temperature of the air exiting the DOC and DPF after the air pump 166 is on. For example, DEF injection may be disabled if the SCR temperature is too high or the temperature of the gas exiting the DPF 126 is too low. The SCR temperature may be determined, for example, based on an average of exhaust temperatures into and out of the SCR catalyst 124. The exhaust temperature sensors operate based on flowing gas, so the air pump 166 may be operated and DEF injection may be disabled for a period while the exhaust temperature sensors become ready.

When the temperature of the SCR catalyst 124 is less than the predetermined temperature, the target module 204 may determine an enthalpy rate of the (hot) air coming from the DPF 126 and entering the decomposition tube 131. The enthalpy rate may need to be greater by a factor of X than an enthalpy consumption rate corresponding to a maximum DEF dosing rate allowed. Processing of DEF within the decomposition tube 131 is endothermic, as each step in the process is endothermic, such as raising the temperature of the water from 25 degrees C. to 100 degrees C., evaporating the water, subliming solid urea into gaseous urea, and decomposing urea into NH3 and HNCO, etc. Therefore, a DEF dosing rate may have a DEF enthalpy consumption rate associated with it.

The difference between the enthalpy rate of the hot air flow created by th air pump and the hot DOC and DPF upstream and the factor X may define a maximum enthalpy consumption rate and thus the corresponding maximum DEF dosing rate. The target module 204 may then set the target DEF injection rate to cause dosing at the maximum enthalpy consumption rate.

The factor (value) X may be calibrated based on one or more characteristics of the decomposition tube 131. When the DEF is injected into the decomposition tube 131, the droplets may impinge on surfaces. These surfaces are heated by the hot gas flow and cooled by the impinging droplets. If a wall film forms on the surface of the decomposition tube 131, the temperature will decrease, for example, due to the evaporation of the water in the DEF droplets. The target module 204 may limit the target DEF injection rate so that the enthalpy rate of the air is sufficient to keep the surface of the decomposition tube 131 hot and to prevent wall film formation.

As the loading of the SCR catalyst 124 after engine shutdown continues, the heat stored in the upstream DOC 122 and DPF 126 decreases. Correspondingly, the enthalpy rate of the (hot) air flow decreases. Therefore, the maximum DEF injection rate also decreases.

The present storage may not reach the target storage before the target DEF injection rate reaches zero based on the enthalpy rate of the air. The burner 154 may then be turned on. This increases the enthalpy rate of the air flowing to the SCR catalyst 124. The increase in the enthalpy rate is a function of the fuel feed rate and the lower heating value of the fuel. The increased enthalpy rate enables the target module 204 to increase the target DEF dosing rate based on the difference between the enthalpy rate and the factor X. At the same time, the rate of heating by the burner 154 may not be so high as to increase the temperature of the SCR catalyst 124. As described above, this temperature may need to decrease over time to that temperature specified for and corresponding to the final ammonia storage target.

Once the present storage reaches the target storage, DEF injection and the air pump 166 are disabled. If the burner 154 has been operating (providing heat), it too is disabled.

Figure 3:
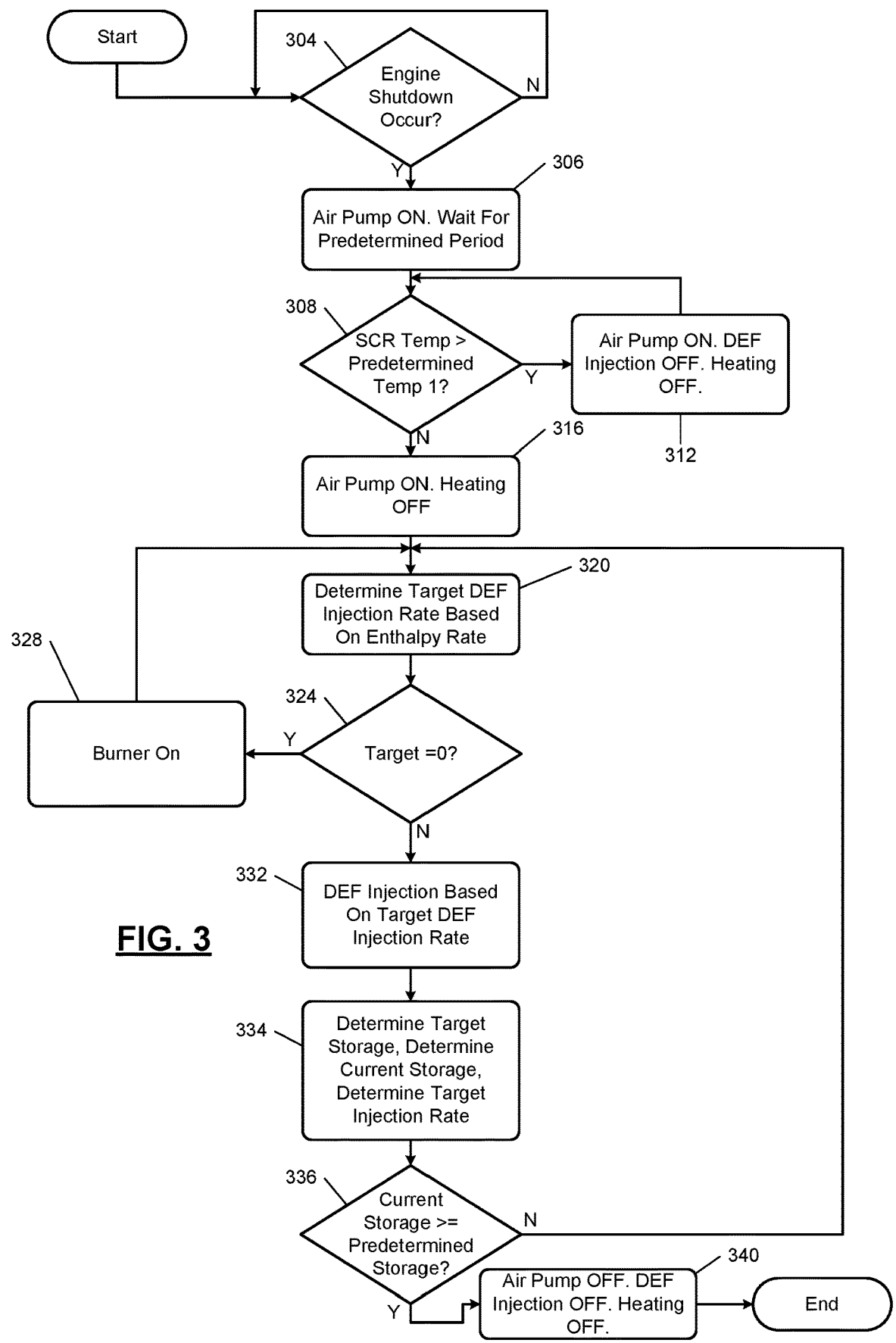
FIG. 3 is a flowchart depicting an example method of controlling DEF injection, heating, and cooling after an engine shutdown.

FIG. 3 is a flowchart depicting an example method of controlling DEF injection, heating, and cooling after an engine shutdown. Control begins with 304 where the target module 204 and the temperature control module 220 determine whether the engine control module 108 has shut down the engine 102. If 304 is true, control continues with 306. If 304 is false, control may remain at 304, and normal engine on control of the burner 154 and DEF injection may be used.

At 306, the temperature control module 220 turns the air pump 166 ON and maintains the air pump 166 ON for a predetermined period, and control waits for the predetermined period to allow the temperature sensors to obtain accurate measurements before proceeding with 308. Alternatively, the temperature control module 220 may utilize temperature measurements form at or immediately before engine shutdown.

At 308, the target module 204 and the temperature control module 220 determine whether the SCR temperature is greater than the predetermined temperature (Predetermined Temp 1). If 308 is true, control continues with 312. If 308 is false, control continues with 316. At 312, the temperature control module 220 turns or maintains the air pump 166 ON and turns or maintains OFF both fuel injection by the fuel injector 158 and spark by the spark plug 162. Also at 312, the target module 204 sets the target supply rate to zero, and the DEF control module 208 does not perform DEF injection.

At 316, the temperature control module 220 turns or maintains ON the air pump 166 and turns or maintains OFF both fuel injection by the fuel injector 158 and spark by the spark plug 162. At 320, the target module 204 determines the target DEF injection rate based on the enthalpy rate of gas flowing to the SCR catalyst 124, as discussed above.

At 324, the temperature control module 220 determines whether the target DEF injection rate is set to zero. If 324 is true, the temperature control module 220 turns or maintains on the burner 154 at 328, and control returns to 320. DEF injection is disabled. If 324 is false, control continues with 332.

At 332, the DEF control module 208 controls DEF injection based on the target DEF injection rate. At 334, the storage module 216 updates the current storage of the SCR catalyst 124. The storage module 216 may update the current storage by integrating a present supply rate to determine a mass of ammonia supplied to the SCR catalyst 124 and adding the determined mass to the current storage.

At 336, the target module 204 and the temperature control module 220 determine whether the current storage of the SCR catalyst 124 is greater than or equal to the predetermined storage. If 336 is false, control returns to 320 to continue post loading the SCR catalyst 124. If 336 is true, post loading of the SCR catalyst 124 for the next engine startup is complete, control continues with 340. At 340, the DEF control module 208 turns OFF DEF injection and the temperature control module turns or maintains OFF the air pump 166, fuel injection by the fuel injector 158, and spark by the spark plug 162. DEF injection and heating and cooling may be kept off until a next engine startup. If engine startup is requested or predicted during the example of FIG. 3, control may end and startup control of the DEF injection and the burner 154 may begin.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. An exhaust control system, comprising:
    a temperature control module configured to, in response to a shutdown of an engine, turn on an air pump that, when on, pumps air into an exhaust system of the engine upstream of a selective catalytic reduction (SCR) catalyst;
    a target module configured to, while the air pump is on and the engine is off in response to the shutdown, selectively determine a target rate of injection of a diesel exhaust fluid (DEF) by a DEF injector based on increasing a present amount of ammonia stored by the SCR catalyst to at least a predetermined amount of ammonia; and
    a DEF control module configured to, while the air pump is on and the engine is off in response to the shutdown, control injection of the DEF by the DEF injector upstream of the SCR catalyst based on the target rate.

2. The exhaust control system of claim 1 wherein, when a temperature of the SCR catalyst is greater than a predetermined temperature, the temperature control module is configured to operate the air pump.

3. The exhaust control system of claim 2 wherein the temperature control module operates the air pump for a predetermined period before determining whether the temperature of the SCR catalyst is greater than the predetermined temperature.

4. The exhaust control system of claim 2 wherein, when the temperature of the SCR catalyst is greater than the predetermined temperature, the temperature control module is further configured to:
    disable fuel injection by a fuel injector configured to inject fuel into the exhaust system upstream of the SCR catalyst; and
    disable spark from a spark plug configured to ignite fuel from the fuel injector.

5. The exhaust control system of claim 2 wherein a maximum ammonia storage capacity of the SCR catalyst is less than the predetermined amount of ammonia when the temperature of the SCR catalyst is greater than the predetermined temperature.

6. The exhaust control system of claim 2 wherein:
    when the temperature of the SCR catalyst is greater than the predetermined temperature, the target module is configured to set the target rate of injection of the DEF to zero; and
    the DEF control module is configured to not inject DEF using the DEF injector when the target rate of injection of DEF is set to zero.

7. The exhaust control system of claim 2 wherein:
    when the temperature of the SCR catalyst is less than the predetermined temperature, the target module is configured to determine a target injection rate based on an enthalpy rate of gas flowing to the SCR catalyst; and the DEF control module is configured to inject DEF based on the target injection rate.

8. The exhaust control system of claim 7 wherein the target module is configured to decrease the target injection rate as the enthalpy rate decreases.

9. The exhaust control system of claim 8 wherein the target module is configured to increase the target injection rate as the enthalpy rate increases in response to an addition of heat.

10. The exhaust control system of claim 6 wherein, when the target injection rate is zero, the temperature control module is configured to:
- operate the air pump;
- enable fuel injection by a fuel injector configured to inject fuel into the exhaust system upstream of the SCR catalyst; and
- provide spark from the spark plug configured to ignite fuel from the fuel injector.

11. The exhaust control system of claim 1 wherein:
- in response to a determination that the present amount of ammonia stored by the SCR catalyst is greater than or equal to the predetermined amount of ammonia after the shutdown, the target module is configured to set the target rate of injection of the DEF to zero;
- the DEF control module is configured to not inject DEF using the DEF injector when the target rate of injection of DEF is set to zero; and
- in response to the determination that the present amount of ammonia stored by the SCR catalyst is greater than or equal to the predetermined amount of ammonia after the shutdown, the temperature control module is configured to:
  - turn off the air pump;
  - disable fuel injection by a fuel injector configured to inject fuel into the exhaust system upstream of the SCR catalyst; and
  - disable spark from a spark plug configured to ignite fuel from the fuel injector.

12. An exhaust control method, comprising:
- in response to a shutdown of an engine, turning on an air pump that, when on, pumps air into an exhaust system of the engine upstream of a selective catalytic reduction (SCR) catalyst;
- while the air pump is on and the engine is off in response to the shutdown, selectively determining a target rate of injection of a diesel exhaust fluid (DEF) by a DEF injector based on increasing a present amount of ammonia stored by the SCR catalyst to at least a predetermined amount of ammonia; and
- while the air pump is on and the engine is off in response to the shutdown, injecting DEF by the DEF injector upstream of the SCR catalyst based on the target rate.

13. The exhaust control method of claim 12 further comprising, when a temperature of the SCR catalyst is greater than a predetermined temperature, operating the air pump.

14. The exhaust control method of claim 13 further comprising operating the air pump for a predetermined period before determining whether the temperature of the SCR catalyst is greater than the predetermined temperature.

15. The exhaust control method of claim 13 further comprising, when the temperature of the SCR catalyst is greater than the predetermined temperature:
- disabling fuel injection by a fuel injector configured to inject fuel into the exhaust system upstream of the SCR catalyst; and
- disabling spark from a spark plug configured to ignite fuel from the fuel injector.

16. The exhaust control method of claim 13 wherein a maximum ammonia storage capacity of the SCR catalyst is less than the predetermined amount of ammonia when the temperature of the SCR catalyst is greater than the predetermined temperature.

17. The exhaust control method of claim 13 further comprising:
- when the temperature of the SCR catalyst is greater than the predetermined temperature, setting the target rate of injection of the DEF to zero; and
- not injecting DEF using the DEF injector when the target rate of injection of DEF is set to zero.

18. The exhaust control method of claim 13 further comprising:
- when the temperature of the SCR catalyst is less than the predetermined temperature, determining a target injection rate based on an enthalpy rate of gas flowing to the SCR catalyst; and
- injecting DEF based on the target injection rate.

19. The exhaust control method of claim 18 further comprising decreasing the target injection rate as the enthalpy rate decreases.

20. The exhaust control method of claim 19 further comprising increasing the target injection rate as the enthalpy rate increases in response to an addition of heat.

* * * * *